Dec. 11, 1928.  J. P. THURELL  1,695,217
SEPTIC TANK
Filed March 23, 1927   2 Sheets-Sheet 1
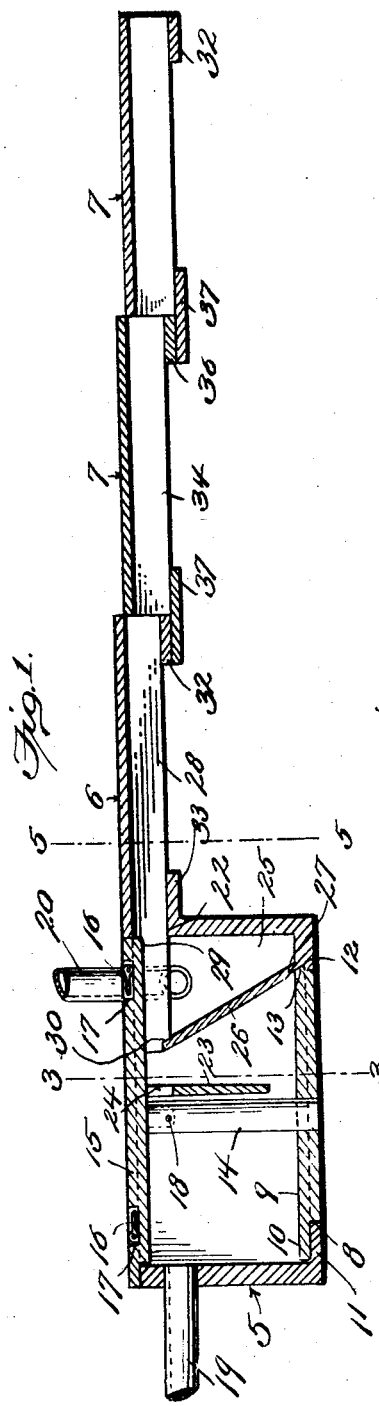
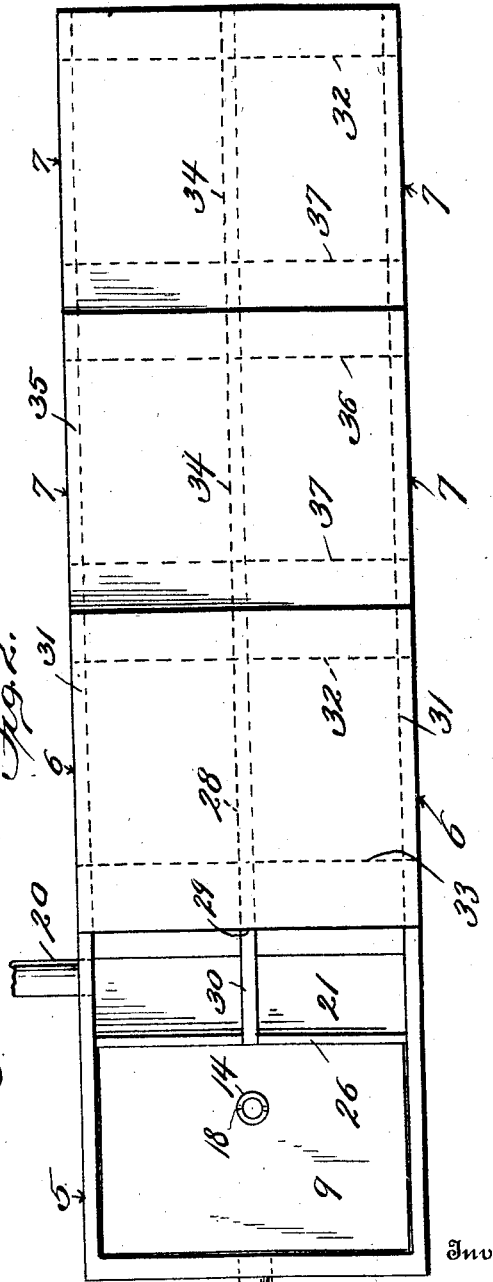
Inventor
John P. Thurell
By
Attorney Dec. 11, 1928.
J. P. THURELL
1,695,217
SEPTIC TANK
Filed March 23, 1927
2 Sheets-Sheet 2
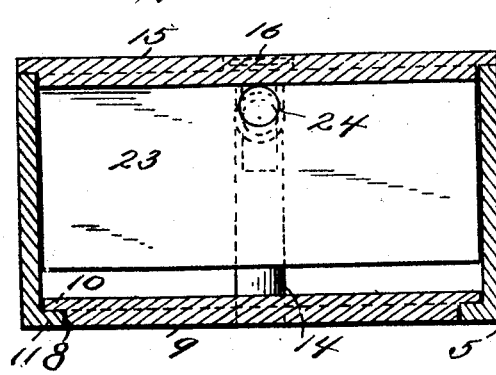
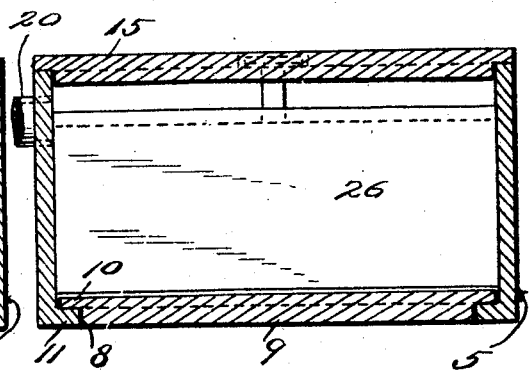
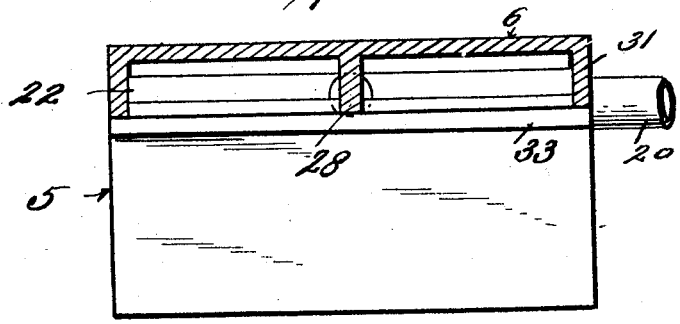
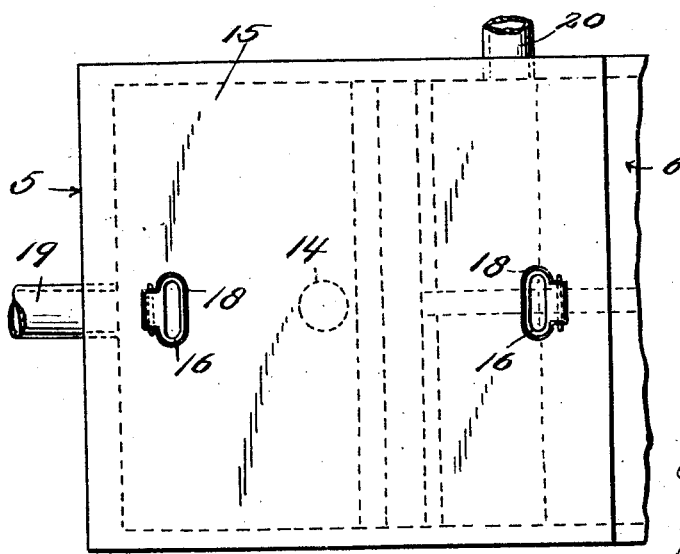
Inventor
John P. Thurell
By
Attorney Patented Dec. 11, 1928.

1,695,217

UNITED STATES PATENT OFFICE.

JOHN P. THURELL, OF FORT MYERS, FLORIDA.

SEPTIC TANK.

Application filed March 23, 1927. Serial No. 177,781.

This invention relates to septic tanks, and the objects of the same are as follows:—

To facilitate the installation of the tank, particularly where it has to be located in loose sand, quick sand or water, by providing a bottom structure of such character as to permit practical placement thereof in operative position; to provide for retention in solution and practical dissolving of the chemical constituents and solid matter of the effluvia prior to discharge thereof to conduit means and seepage thereof by the deposit on the ground to produce a free discharge flow and material reduction to tendency of sliming of the ground where seepage takes place through the action of a surplus of undissolved chemicals; to materially add to the effectiveness of the dissolving operation of the more resistful chemicals by the addition of rain water to the tank, by connecting a rain water conduit thereto and thus increasing the liquid content of the tank and taking advantage of the natural ammoniacal and other chemical constituency of rain water to effectively dissolve, or, to at least reduce to an immaterial minimum crystallization of these chemicals relative to the seepage ground on which the discharged liquids are deposited, and to generally improve septic tank structures and render them more efficient in operation, strong and durable and convenient and expeditious in installation.

With these and other objects and advantages in view, the invention consists in the construction and arrangement of parts which will be more fully hereinafter described and claimed.

In the drawings:—

Figure 1 is a longitudinal vertical section of the improved septic tank and conduit sections associated therewith.

Figure 2 is a top plan view of the tank and sections with the cover of the tank removed.

Figure 3 is a transverse vertical section on the line 3—3, Figure 1 looking towards the front end of the tank.

Figure 4 is a transverse vertical section on the line 3—3, Figure 1 looking towards the rear end of the tank.

Figure 5 is a transverse vertical section on the line 5—5, Figure 1.

Figure 6 is an enlarged top plan view of the tank with the cover applied thereto.

The improved septic tank and the separable discharge or distributing members that may be associated therewith or in part permanently secured thereto, may be of any contour, material or combination of materials adapted for the purpose, and furthermore, under certain installations, a number of the improved tanks may be connected and arranged in tandem, and the preferred construction hereinafter particularly described in detail may be modified in its general dimensions and proportions, materials used in its construction and details, fully within the scope of the appended claims, to accommodate the improved tank organization to various contingencies or particular installations required in accordance with the nature of the building with which it is associated as an effective means of taking care or raw sewage passing thereinto.

In the preferred form of septic tank as shown in the accompanying drawings, the numeral 5 generally refers to the tank which is of rectangular form and has a rearwardly extending distributor 6 formed as a part thereof, and also separable distributors 7, the distributors all being of substantially the same structure and the number used depending upon the nature of the place of deposit to which the discharge is made.

The tank 5, as shown, has an opening 8 through the bottom in which is removably fitted a bottom closure or cover 9 practically secured in position when the tank is duly installed to avoid leakage at the joints formed between the edges of this bottom cover at the walls of the opening 8. As clearly shown by Fig. 1 the bottom cover 9 has an extended reduced flange 10 at the front end and opposite sides to fit over the bottom of the tank which is reduced in thickness, as at 11, the rear end of the said bottom cover having a materially shorter flange 12 and an upwardly and forwardly inclined or beveled edge 13. The bottom cover has a post 14 rising therefrom and extending up to the bottom of a top cover 15, this top cover being provided with movably mounted grips or handles 16, normally held in recesses 17 opening upwardly through the upper surface of the cover 15, and whereby the latter may be easily manipulated in removing or applying the same. The post 14 has an opening 18 in its upper end for application thereto of a suitable hook means or other implement to assist in raising or removing the bottom cover, or in applying the same, as shown by Figure 1. At its front end the tank 5 has a raw sewage pipe 19 communicating therewith, the said pipe being located near the upper edge of the tank, and a side water pipe 20 also communicating with the rear portion of the tank through an opening 21 for the purpose of admitting fresh water into the tank, preferably rain water, it being understood that the said pipe 20 will be supplied with a suitable valve structure and other attachments well known in connection with inlet pipes, the pipe 20 in its essential function simply forming an inlet for fresh water into the tank, preferably at the rear of the said tank, for assisting in the operation of the tank. The size and duplicate form of said pipe is non-essential, as the object in view is to provide a fresh water supply means for the tank. The opening 21 is about on a level with the opening through the front end of the tank for the raw sewage pipe 19, so that there may be a uniform level of inlet at both points, and at the rear end of the tank is an upper discharge opening 22 which has its bottom slightly above the levels of the openings for the raw sewage pipe 19 and the opening 21 for the pipe 20. The opening 22 in the present instance extends across the rear end of the tank, or is of substantially rectangular form, as clearly shown by Fig. 5. This discharge opening 22, however, may be modified at will as to its contour and extent, but for all practical purposes the form and extent thereof just specified is preferred.

The tank 5 is partially divided into two compartments by a depending partition 23, which is secured to the underside of the top cover 15 and is normally located close to and in rear of the position of the post 14, as shown by Fig. 1, the said partition 23 having an upper central opening 24, as more clearly shown by Fig. 3. Through the medium of the partition 23 a front compartment is formed in advance thereof, and which may be termed the receiving compartment, and is separated at its upper portion from the rear, or what may be termed the discharging compartment, so that the heavy matter of the effluvia will not directly pass out from the tank before effective dissolving and solution of the same has been accomplished in the tank. In the rear extremity of the tank a discharge trough 25 is formed by an upwardly and forwardly inclined wall 26 extending from the bottom of the tank at the front limit or rear wall of the opening 8. The wall 26 extends upwardly into the rear portion of the tank and forms the rear limit of the discharge trough, the upper end of said wall terminating a slight distance above the lower portion of the discharge opening 22, though it will be understood that this specific dimension of the wall 26 may be slightly changed without in the least affecting the invention, and involves merely an immaterial or simple detail of construction. The lower end of the wall 26 has a front reduced portion 27 against which the rear bevel 13 of the rear short flange 12 of the bottom cover 9 has close fitting when the said latter cover is applied in closed position. The wall through its inclination does not in the least interfere with the withdrawal from or application of the cover 9 to the tank, it only being necessary to slightly tilt the front extremity of the said bottom cover upwardly in removing or applying the same relatively to the tank.

The distributors are substantially similar in construction, the distributor 6 being slightly modified in view of the structure of the distributor 7, but each of the latter is a duplicate of the other. The distributor 6 has a central partitional rib 28 and at its forward extremity is reduced by an upper recess 29, this forward reduced extremity extending longitudinally through the upper central part of the trough 25 and having a notch 30 at its forward end to fit over the upper end of the wall 26. The upper recess 29 forms a rear seat for the reception of the top cover 15, as clearly shown by Fig. 1. Each distributor is formed with depending sides 31, as indicated by dotted lines in Fig. 2, and extending across the bottom of the rear end of the distributor 6 is a brace 32 which serves also as a dam and assists to effect an even distribution of the water and dissolved effluvia or other material passing through the distributor from the tank 5. The distributor 6, as hereinbefore described extends rearwardly beyond the rear end of the tank 5 and the lower or bottom partition thereof is supported by a rearwardly projecting horizontal ledge 33 formed as a part or secured to the rear wall of the tank. Each distributor 7 is likewise formed with a central partitional rib 34 and depending sides 35 to which is secured a lower cross brace 36 substantially similar to the corresponding parts of the distributor 6. In addition, each distributor 7 has a forwardly projecting lower assembling batten 37 which extends transversely across the distributor and has about one half of the same firmly secured to the partitional rib 34 and sides 35 and the remaining portion projecting forwardly to snugly and closely fit against the undersides of the cross braces 32 and 36 where a number of the distributors 7 may be employed. The cross batten 37 provides means for assembling the distributors in close conterminal relation and also as a supporting means for properly placing the distributors on the ground surface. The first cross batten 37 disposes the top surface of the first distributor 7 a little lower than the similar surface of the distributor 6, and the third distributor 7 is likewise lowered through the same means with respect to the distributor 7 with which it is assembled, and so on through the whole series of the said distributors 7 when the latter are continued to a greater number than those shown. However, the lowering of the said distributor 7 does not interfere with the free flow or passage of liquid and dissolved effluvia through the distributors, all the distributors having open bottoms, being practically boxes with open bottoms. In some installations it may be only necessary to use the distributor 6, and in others the addition of a single distributor 7, and in a still further application a second distributor 7 may be used, depending upon the character of the ground surface and the area to be covered by the distributors for the purpose of deposit and seepage. In sandy soil a less number of the distributors will be used, and in some instances only the single distributor 6 secured to and projecting from the rear of the tank 5 will be necessary.

In the operation of the improved septic tank the sewage passing through the pipe 19 into the tank is subjected to a dissolving action, so that all the sewage will be practically liquefied before discharge takes place from the tank and deposit thereof on the ground. The sewage entering the first compartment of the tank will be caused to flow down under the lower end of the baffle 23 into the second compartment of the tank, the opening 24 of the baffle 23 acting as a pressure equalizer and relief. During the time that the sewage is in the tank before entering the trough 25, and depending on the action of the anaerobic bacteria, the floating solids will be practically dissolved or converted into substantially liquid form, and if there still remains any undissolved solids they will enter the trough 25 with the liquid and by the admission, preferably of rain water through the opening 21 into the said trough, they will be liquefied, the undissolved solids being retained in the trough 25 until liquefaction ensues. It is well understood that rain water is particularly desirable as distinguished from ordinary main or other fresh water, due to the pure condition of rain water and its greater solvent action relatively to the precipitates held in suspension and consisting essentially of lime, magnesium and also sulphates and carbonates, etc., and which are only slightly soluble in water taken from other sources and distinguished from rain water. Ordinarily these insoluble materials are filtered out by the earth and it finally becomes necessary to change the location of the distributor elements when using other types of tanks. However, by the use of rain water this disadvantage is very materially eliminated in view of the fact that precipitates held in suspension are practically dissolved by the rain water while retained in the tank 5 and when the liquid is discharged through the rear opening 22 of the said tank by the way of the distributor means heretofore described, and deposited on the earth or sand bed as the case may be, the remaining undissolved portions of the said precipitates will be minimized to such an extent as to require no change of location of the distributing means. The central ribs of the distributors form two separate channels through the distributors, and materially aid in a more effective distribution of the liquid discharged therethrough in addition to the strengthening characteristics of said ribs.

The removable bottom of the tank is an advantageous feature when installing the complete apparatus particularly in sandy ground or very soft ground constituents may be removed from the interior of the tank, or pit formed thereby by first removing the top cover 15 and the bottom cover 9 and under which operation the sides of the tank provide brace means for the excavation.

A further advantage of the improved septic tank construction is its compactness and facility with which it can be installed in operative position with certainty in placement of the several parts thereof for practical operation.

What is claimed as new is:—

1. A septic device of the class specified, comprising a tank with a removable bottom and top, and rear discharge means with an open bottom for carrying away the contents of the tank.

2. A septic device of the class specified, comprising a tank having a vertical baffle depending thereinto and forming a partial partition located at the upper part of the tank, and rear longitudinal means with an open bottom for discharging the contents of the tank.

3. A septic device of the class specified, comprising a tank having rear end discharge means including a horizontally disposed distributor of box-like form with an open bottom.

4. A septic device of the class specified, comprising a tank having rear end discharge means including a distributor of box-like form with an open bottom, and a central longitudinally extending rib.

5. A septic device of the class specified, comprising a tank having a discharge means including a distributor projecting rearwardly therefrom of box-like form having an open bottom, and a cross-brace secured to the rear bottom portion of said distributor.

6. A septic device of the class specified, comprising a tank having a rear discharge means including a distributor of box-like form with an open bottom and having a central longitudinal rib therein, and a cross-brace secured to the rear bottom position of said distributor.

7. A septic device of the class specified, comprising a tank having a rear end discharge means of box-like form with an open bottom, a cross-brace secured to the rear bottom portion of said distributor, an auxiliary distributor of similar structure having a cross cleat secured against the front bottom portion thereof and partially projecting to bear against the underside of the cross-brace.

8. A septic device of the class specified, comprising a tank having a sewage entrance means at the front end near the top of said tank and a rear discharge means with an open bottom connected to the top portion of the tank, and baffle means dividing the upper portion of the trough adjacent to said rear discharge means and having a central opening therethrough.

9. A septic device of the class specified, comprising a tank having a sewage entrance means at the front end near the top of said tank and a rear discharge means located at the top portion of the tank, and side conduit means connected to the rear portion of the tank for admitting fresh water thereto, preferably rain water, the inlet of said conduit means being on a level with the entrance means for the sewage at the front of the tank.

10. A septic device of the class specified, comprising a tank having a removable bottom with an upwardly projecting post formed with a transverse top opening, a removable cover, a sewage conveying and entrance means at the front end near the top of said tank and a rear discharge means located above the said entrance means, baffle means depending from the removable cover into the tank and having an opening therethrough, a trough at the rear part of the tank adjacent to the said discharge means, and distributor means applied to the rear end of the tank to receive the contents of the latter and deposit the same on the ground surface In testimony whereof I have hereunto set my hand.

JOHN P. THURELL.